(12) United States Patent
Kamauchi

(10) Patent No.: US 11,275,689 B2
(45) Date of Patent: Mar. 15, 2022

(54) DATA LOADING METHOD, DATA LOADING APPARATUS, AND RECORDING MEDIUM

(71) Applicant: FUJITSU LIMITED, Kawasaki (JP)

(72) Inventor: Akitaka Kamauchi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 16/724,524

(22) Filed: Dec. 23, 2019

(65) Prior Publication Data

US 2020/0125489 A1 Apr. 23, 2020

Related U.S. Application Data

(63) Continuation of application No. PCT/JP2017/024738, filed on Jul. 5, 2017.

(51) Int. Cl.
*G06F 12/00* (2006.01)
*G06F 12/084* (2016.01)
*G06F 16/2455* (2019.01)

(52) U.S. Cl.
CPC ...... *G06F 12/084* (2013.01); *G06F 16/24552* (2019.01); *G06F 2212/1024* (2013.01)

(58) Field of Classification Search
CPC ............. G06F 12/084; G06F 16/24552; G06F 2212/1024
See application file for complete search history.

(56) References Cited

U.S. PATENT DOCUMENTS

| 5,408,652 A | * | 4/1995 | Hayashi | G06F 16/22 707/713 |
| 5,895,487 A | * | 4/1999 | Boyd | G06F 12/0897 711/122 |
| 2008/0282057 A1 | * | 11/2008 | Layden | G06F 16/289 711/210 |
| 2010/0057990 A1 | | 3/2010 | Mizuno et al. | |

(Continued)

FOREIGN PATENT DOCUMENTS

| EP | 0454610 A2 * | 10/1991 | ............... G06F 9/52 |
| JP | 04-112260 | 4/1992 | |

(Continued)

OTHER PUBLICATIONS

ISR—International Search Report [Forms PCT/ISA/210, PCT/ISA/220, PCT/ISA/237] for International Patent Application No. PCT/JP2017/024738 dated Sep. 19, 2017.

*Primary Examiner* — Arvind Talukdar
(74) *Attorney, Agent, or Firm* — Fujitsu Patent Center

(57) ABSTRACT

A non-transitory computer-readable recording medium having stored therein a program for causing a computer to execute a processing, the processing includes allocating a plurality of records to a page in shared memory that is able to be accessed simultaneously by a plurality of processings; receiving the plurality of records; writing, based on the plurality of records, information of writing region to the page for each of the plurality of records, and generating a writing processing corresponding to record for the plurality of records; generating, based on written the record to the (Continued)

writing region indicated by the information on the page by the writing processing executed, the page with at least of one of the record written; and loading the page generated to the database.

16 Claims, 19 Drawing Sheets

(56) References Cited

U.S. PATENT DOCUMENTS

2014/0317335 A1　10/2014　Fukutomi et al.
2015/0378933 A1　12/2015　Ooba et al.

FOREIGN PATENT DOCUMENTS

| | | |
|---|---|---|
| JP | 10-124357 | 5/1998 |
| JP | 2010-55369 | 3/2010 |
| JP | 2014-211800 | 11/2014 |
| JP | 2015-201233 | 11/2015 |
| JP | 2016-12166 | 1/2016 |

\* cited by examiner

DATA LOADING METHOD, DATA LOADING APPARATUS, AND RECORDING MEDIUM

CROSS-REFERENCE TO RELATED APPLICATION

This application is a continuation application of International Application PCT/JP2017/024738 filed on Jul. 5, 2017 and designated the U.S., the entire contents of which are incorporated herein by reference.

FIELD

The present invention relates to a data loading method, a data loading apparatus and a recording medium.

BACKGROUND

For example, a relational database management system (RDBMS) uses a high-speed loader that performs processing (load processing) of inserting a large amount of data into a database in a single transaction.

When a high-speed loader receives an input of data (input data) to be loaded onto a database, the high-speed loader converts a plurality of records included in the input data into a database format, and writes the converted plurality of records to a page. Subsequently, the high-speed loader inserts the page on which the plurality of records has been written, into the database.

An example of the related art includes Japanese Laid-open Patent Publication No. 2016-12166, Japanese Laid-open Patent Publication No. 2010-55369, Japanese Laid-open Patent Publication No. 2015-201233, and Japanese Laid-open Patent Publication No. 2014-211800.

SUMMARY

According to an aspect of the embodiments, a non-transitory computer-readable recording medium having stored therein a program for causing a computer to execute a processing, the processing includes allocating a plurality of records to a page in shared memory that is able to be accessed simultaneously by a plurality of processings; receiving the plurality of records; writing, based on the plurality of records, information of writing region to the page for each of the plurality of records, and generating a writing processing corresponding to record for the plurality of records; generating, based on written the record to the writing region indicated by the information on the page by the writing processing executed, the page with at least of one of the record written; and loading the page generated to the database.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The high-speed loader converts a plurality of records included in the input data into a format (tuple) that conforms to the database, and writes the tuple to the page. A plurality of processes writes tuples in parallel to a page, leading to achievement higher speed in load processing.

For example, a high-speed loader performs load processing using a graphics processing unit (GPU) having a plurality of cores, enabling a plurality of processes to write tuples to a page in parallel. For example, it is conceivable to store the page in L1 cache memory in the GPU.

As a restriction of hardware of the GPU, simultaneous access to the L1 cache memory by a plurality of processes is regulated. Therefore, the page is locked while one process is writing a tuple to a page, which regulates writing to the page by other processes. Accordingly, this regulation makes it difficult to achieve higher speed in load processing.

For example, a GPU includes shared memory that can be accessed at the same speed as the L1 cache. The shared memory does not have the above-described restrictions. Therefore, storing a page in the shared memory allows a plurality of processes to simultaneously write tuples on one page.

As a result of allowing a plurality of processes to freely write tuples on one page, tuple overwriting or a reduction in a page usage rate or the like would occur, making it difficult to write tuples properly to a page.

Locking the page and regulating access to the page from other processes while one process is writing a tuple to a page would be able to avoid tuple overwriting or reduction in the page usage rate. Unfortunately, however, this regulates writing tuples in parallel to one page by the plurality of processes, hindering achievement of higher speed in load processing.

In one aspect, an object of the present invention is to properly perform parallel writing of a plurality of records in database loading processing without locking a memory page that is able to be accessed simultaneously.

<Example of System of the Embodiment>

Figure 1:
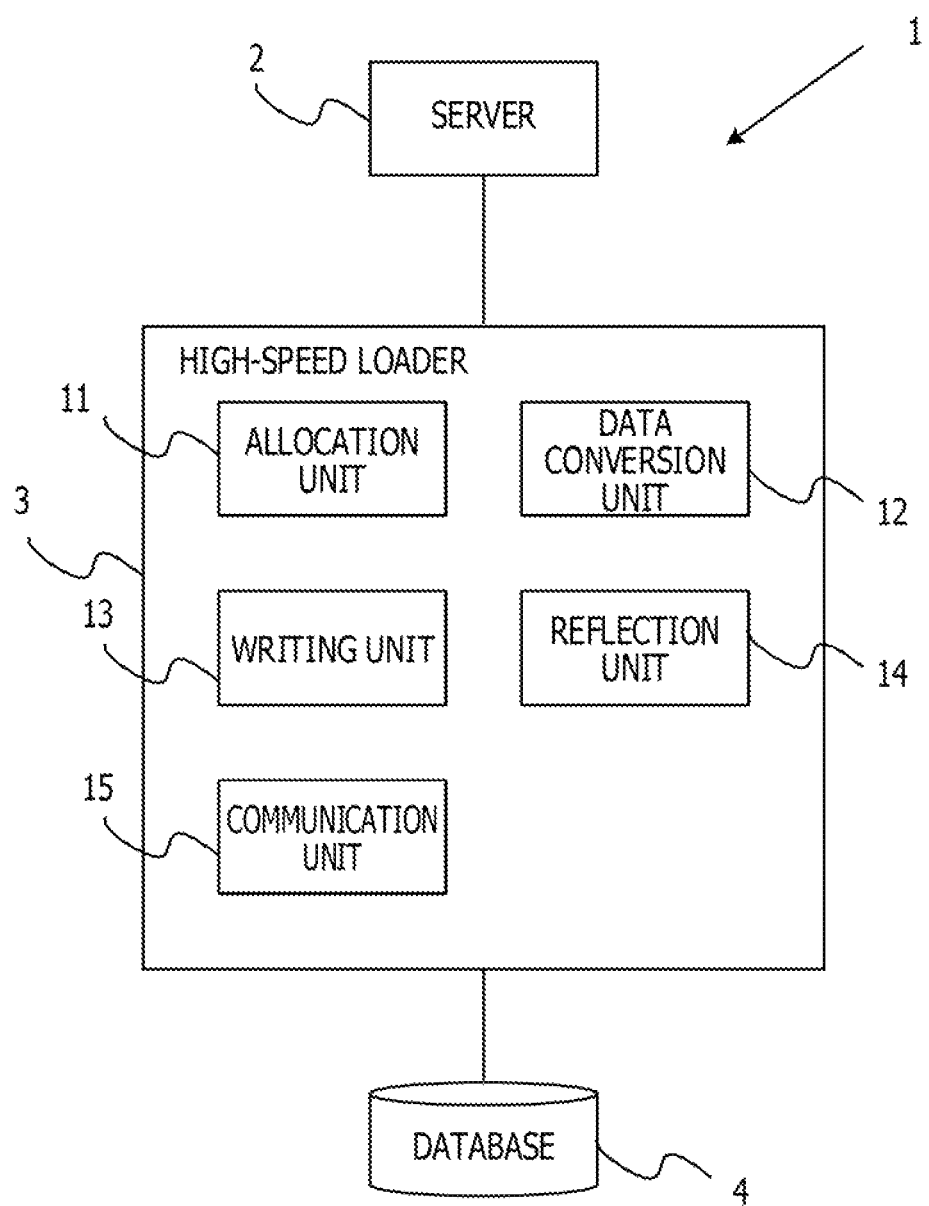
FIG. 1 is a diagram illustrating an example of a system according to an embodiment.

FIG. 1 illustrates an example of a system 1 according to an embodiment. The system 1 includes a server 2, a high-speed loader 3, and a database 4. In the example of FIG. 1, the server 2 and the high-speed loader 3 are connected with each other via a network. In addition, the high-speed loader 3 and the database 4 are connected with each other via another network. The high-speed loader 3 is an example of a data loading apparatus.

The high-speed loader 3 receives one or more of items of data (input data) to be inserted into the database 4 and converts a plurality of records included in the received data into a tuple that conforms to the format of the database 4. The high-speed loader 3 of the embodiment may be applied to an RDBMS, for example.

The high-speed loader 3 writes a plurality of tuples to one page. A page is a minimum unit of input/output for the database 4, and for example, 8 kilobyte size is adopted as the page size in the RDBMS.

The high-speed loader 3 may generate a plurality of pages on which a plurality of tuples has been written. The high-speed loader 3 collectively inserts one or more pages on which a plurality of tuples has been written, into the database 4 as a single transaction. The insertion processing is referred to as load processing. In the embodiment, it is assumed that a large amount of records (tuples) are collectively inserted into the database 4 in the load processing.

FIG. 1 illustrates an example in which the high-speed loader 3 and the database 4 are connected with each other via a network (another network). Alternatively, however, the high-speed loader 3 and the database 4 may be implemented as a single device. In addition, the high-speed loader 3 may receive the above-described input data from a device other than the server 2.

Hereinafter, data (input data) received by the high-speed loader 3 will be described as data in Comma-Separated Values (CSV) format, but the data may be data in a format other than CSV format, As illustrated in the example of FIG. 1, the high-speed loader 3 includes an allocation unit 11, a data conversion unit 12, a writing unit 13, a reflection unit 14, and a communication unit 15.

The allocation unit 11 allocates a plurality of records included in the data received by the high-speed loader 3, to a page. The embodiment assumes that a plurality of pages is generated. Therefore, the allocation unit 11 allocates the plurality of above-described records to one of the plurality of pages.

The data conversion unit 12 includes a plurality of data conversion processes. Each of data conversion processes corresponds to one of the plurality of pages, and converts a plurality of records allocated to the corresponding page, into a tuple. Each of the data conversion processes operates in parallel.

The writing unit 13 includes one line pointer creation process and a plurality of page creation processes for each of pages. Accordingly, one line pointer creation process and a plurality of page creation processes are generated for one page.

The line pointer is an example of control information. The page creation process is an example of a writing process. The line pointer creation process is an example of a control process.

The line pointer creation process acquires a tuple from the data conversion process, writes a line pointer to a page on the basis of the acquired tuple, and generates a page creation process corresponding to the acquired tuple. The line pointer includes information including the tuple information amount (tuple size) and a write start position (offset). The line pointer is used to specify the position of the tuple written within a page at the time of page search.

In the embodiment, a plurality of page creation processes writes tuples in parallel to one page. Therefore, a plurality of tuples is written in parallel to one page. In generation of a page creation process, the line pointer creation process passes line pointer information to the page generation process.

The page creation process writes a tuple in a region designated by the line pointer information, within the page. In the embodiment, the page creation process writes tuples using the position designated by the offset out of line pointer information, as the write start position.

The plurality of page creation processes writes tuples in parallel to the page. As described above, in the embodiment, a plurality of pages exists. Accordingly, the plurality of page creation processes writes tuples in parallel to each of the plurality of pages.

The reflection unit 14 performs processing (load processing) of inserting a plurality of pages on which a plurality of tuples has been written, into the database 4. The reflection unit 14 collectively inserts a plurality of pages on which a plurality of pages has been written, into the database 4 in a single transaction. Execution of the insertion allows a plurality of records (tuples) to be collectively reflected to the database 4.

<Example of GPU Architecture>

Figure 2:
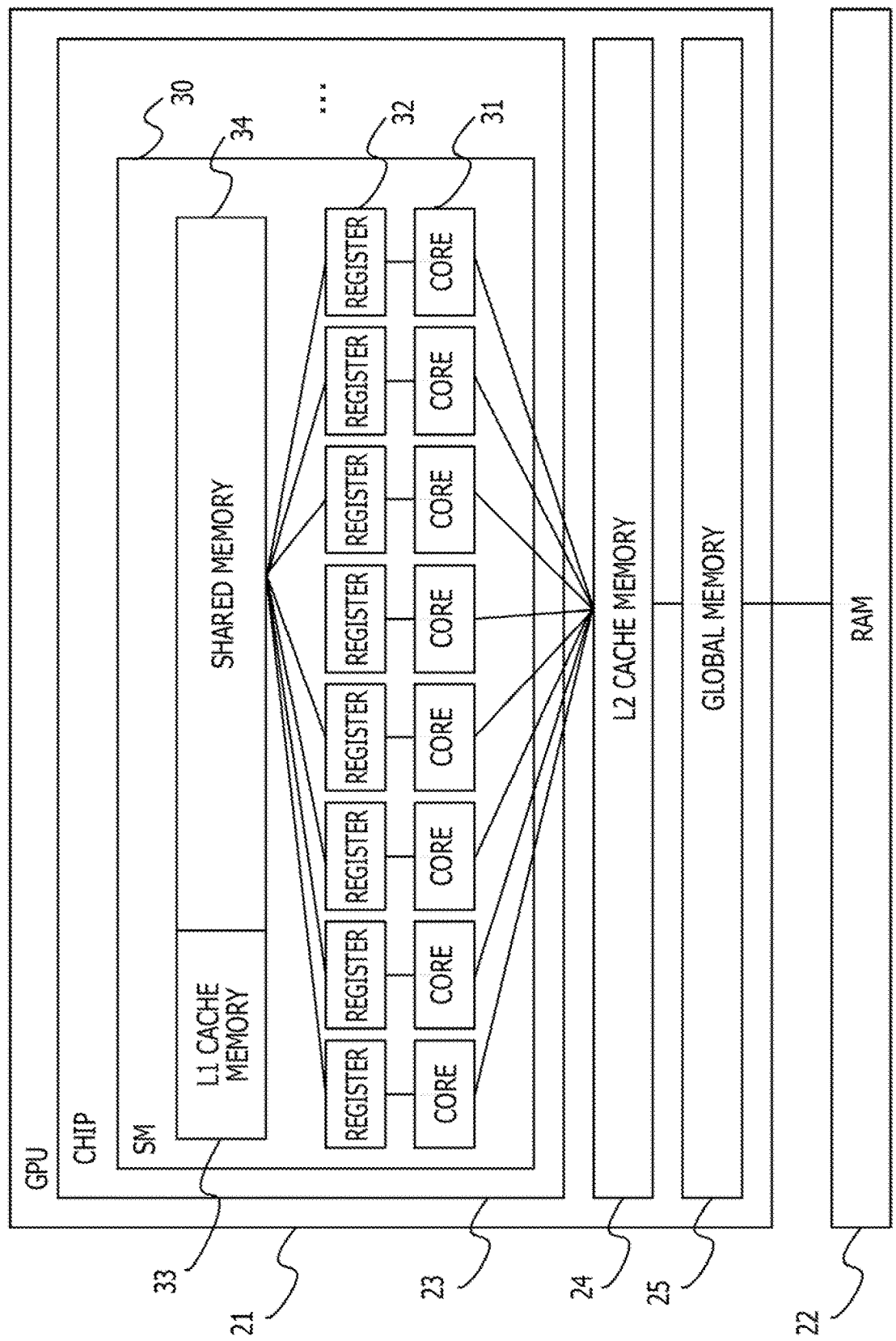
FIG. 2 is a diagram illustrating an example of GPU architecture mounted on a high-speed loader.

FIG. 2 is a diagram illustrating an example of GPU architecture mounted on the high-speed loader 3. The GPU 21 is connected to a random access memory (RAM) 22. The GPU 21 includes a chip 23, L2 cache memory 24, and global memory 25.

A plurality of streaming multiprocessors 30 (denoted as SM in FIG. 2) is mounted on the chip 23. Each of the streaming multiprocessors 30 includes a plurality of GPU cores 31 (denoted as cores in FIG. 2), a plurality of registers 32, L1 cache memory 33, and shared memory 34.

The GPU core 31 is an arithmetic processing circuit that performs arithmetic processing. In the example of FIG. 2, eight GPU cores 31 are mounted on the GPU 21. Therefore, it is possible to obtain parallelism of eight times at maximum. The number of GPU cores 31 mounted on the GPU 21 is not limited to eight. The more the number of GPU cores 31, the higher the parallelism.

The register 32 is provided corresponding to each of the GPU cores 31. The L1 cache memory 33 is cache memory that the GPU core 31 can access at a higher speed next to the register 32. The shared memory 34 is memory that the GPU core 31 can access at the same speed as the L1 cache memory 33.

The GPU core 31 can access the L1 cache memory 33 and the shared memory 34 at the same speed. The ratio between the capacity of the L1 cache memory 33 and the capacity of the shared memory 34 can be flexibly changed.

For example, in a case where the total capacity of the L1 cache memory 33 and the shared memory 34 is 64 kilobytes, the capacity of the L1 cache memory 33 may be set to 16 kilobytes, and the capacity of the shared memory 34 may be set to 48 kilobytes. In the embodiment, it is assumed that the capacity of the shared memory 34 is larger than the capacity of the L1 cache memory 33.

In the embodiment, a plurality of tuples is written to each of a plurality of pages stored in the shared memory 34. Therefore, with more capacity of the shared memory 34, more pages can be stored in the shared memory 34.

The L2 cache memory 24 is memory that can be accessed from each of the GPU cores 31. The access speed from the GPU core 31 is lower than in the case of accessing the L1 cache memory 33. The global memory 25 is memory that can be accessed from each of the GPU cores 31. The access speed from the GPU core 31 is lower than in the case of accessing the L2 cache memory 34.

The L1 cache memory 33 will be described. Due to hardware restrictions on the GPU architecture, simultaneous access from a plurality of processes (processes operating in each of the plurality of GPU cores 31) to the L1 cache memory 33 being a single device will be regulated.

Therefore, while one process is accessing the L1 cache memory 33, accessing from another process accessing to the L1 cache memory 33 will be regulated.

In contrast, the shared memory 34 is memory that the GPU core 31 can access at the same speed as in the case of accessing the L1 cache memory 33, and has no hardware restriction described above. Accordingly, simultaneously accessing from a plurality of processes to the shared memory 34 is permitted.

<Example of Load Processing to Database>

Figure 3:
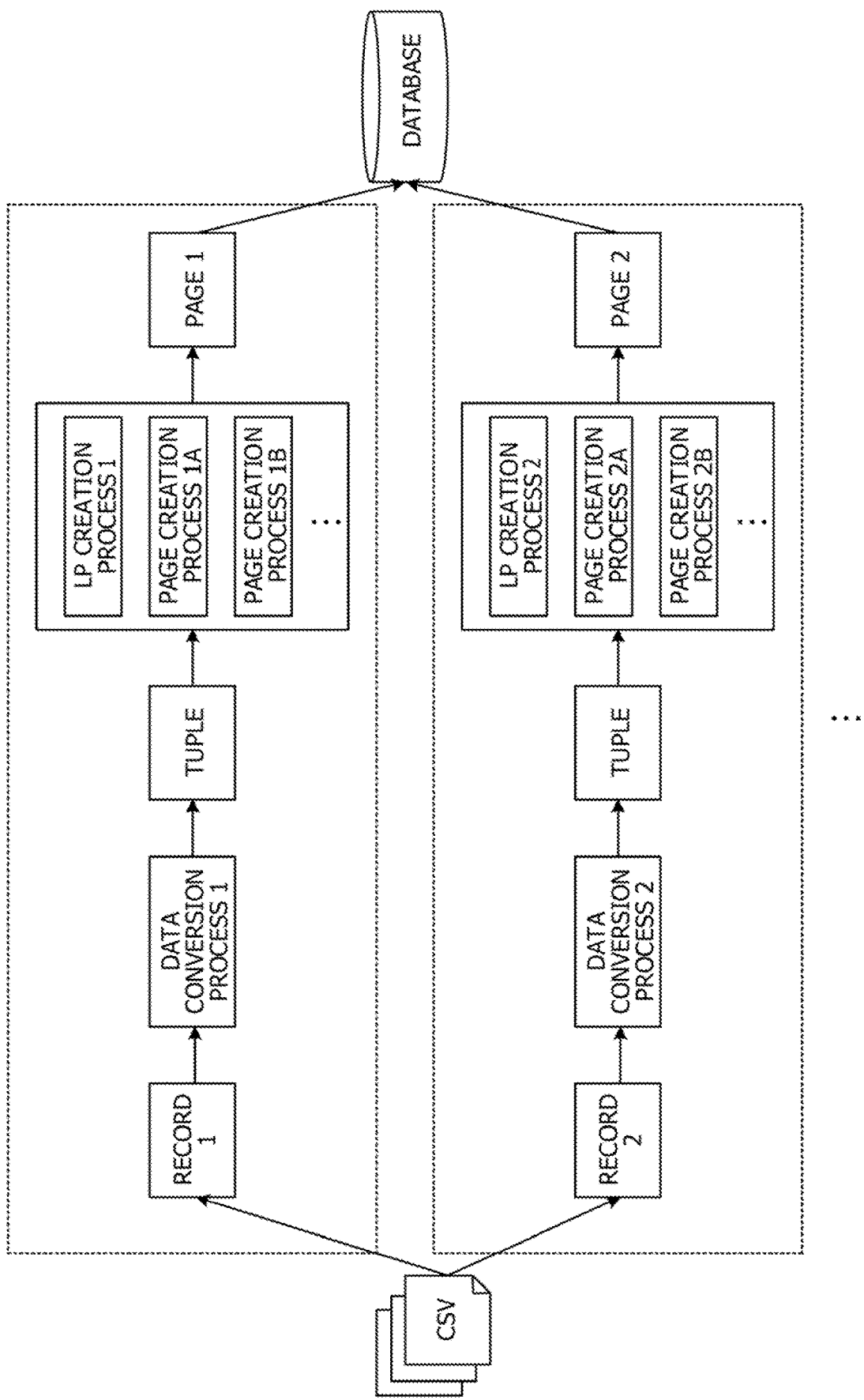
FIG. 3 is a diagram (part 1) illustrating an example of load processing applied to a database.
Figure 4:
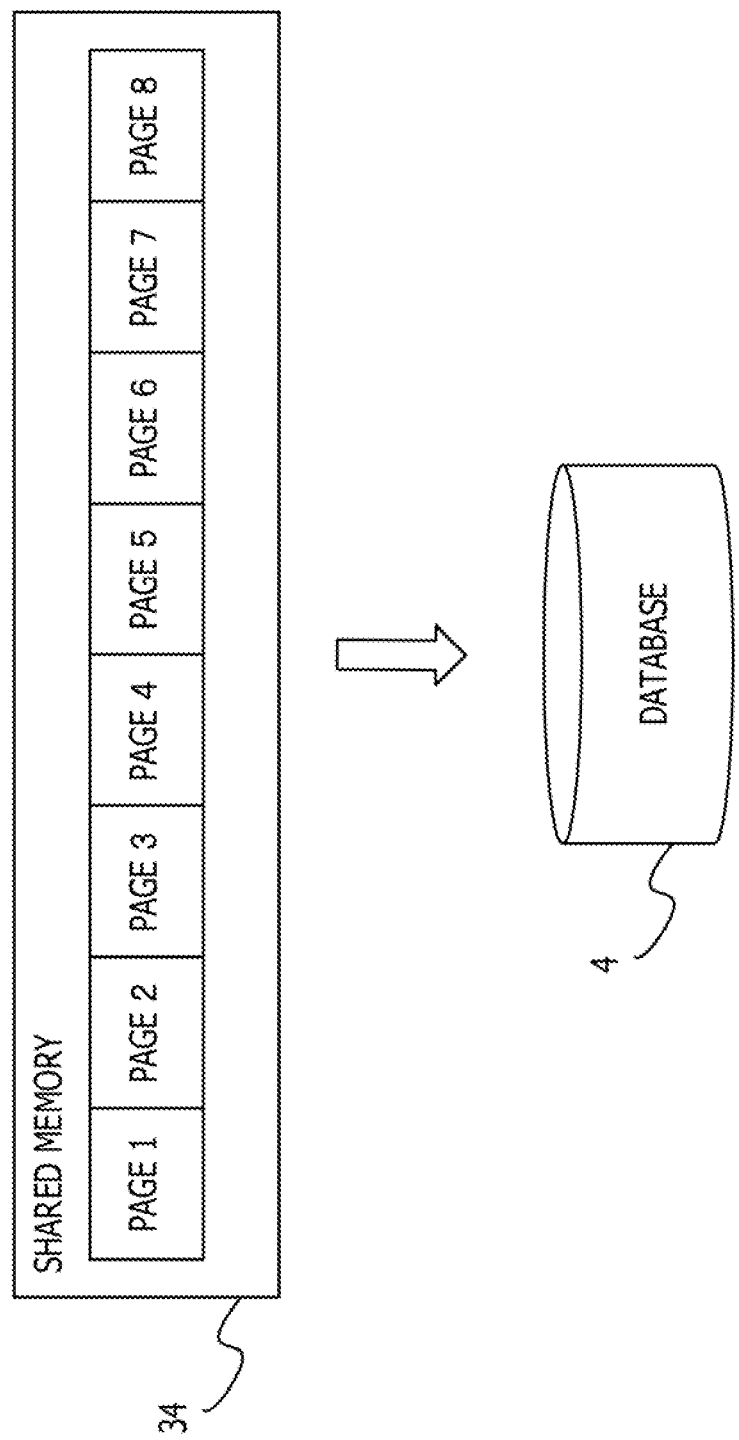
FIG. 4 is a diagram (part 2) illustrating n example of load processing applied to a database.
Figure 5:
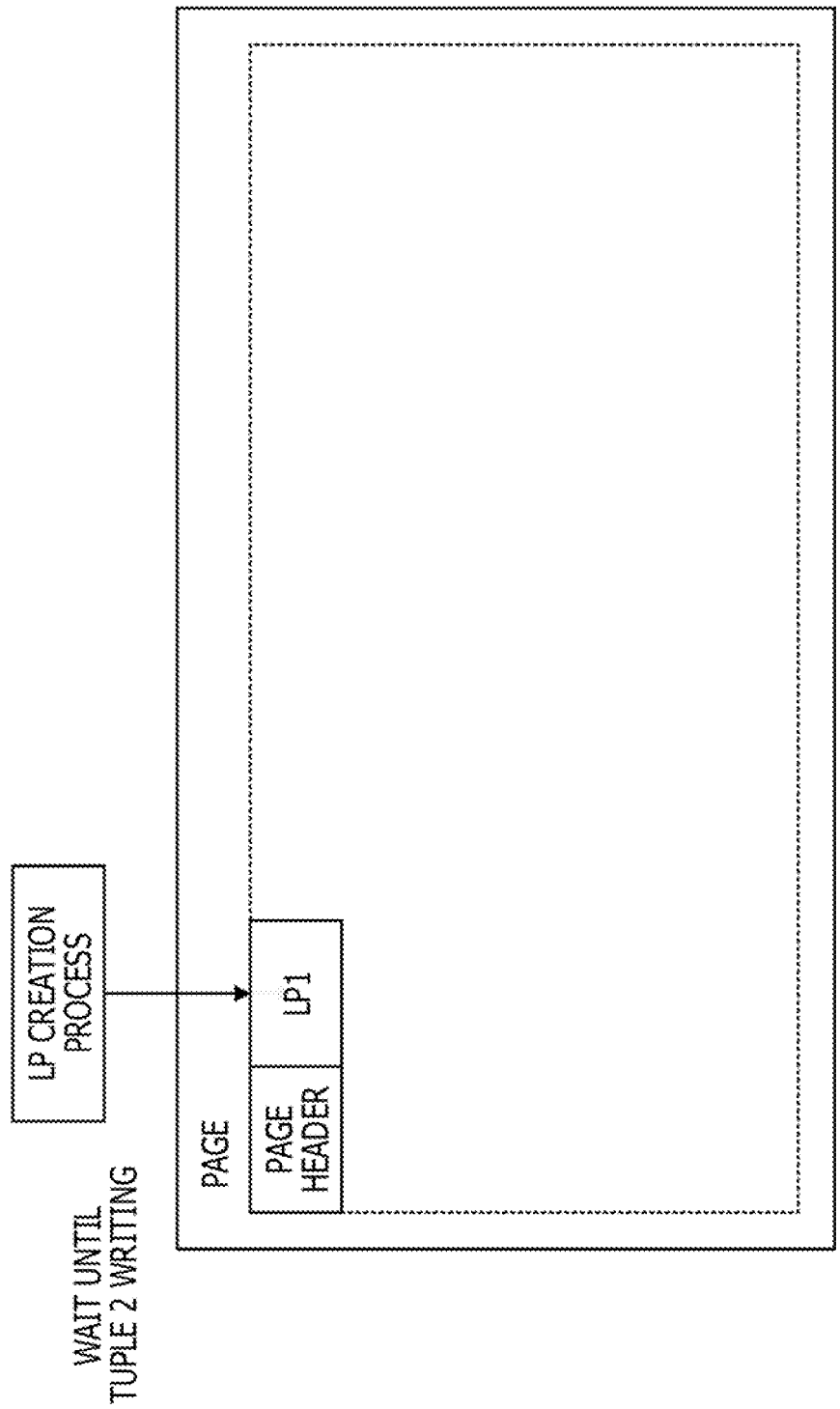
FIG. 5 is a view (part 1) illustrating an example of tuple writing in a case where a page is locked.

Next, an example of load processing to a database will be described with reference to FIGS. 3 and 4. CSV in the example of FIG. 3 is input data received from the server 2. The input data includes a plurality of records.

"CSV" in the example of FIG. 3 indicates input data received by the high-speed loader 3. In the example of FIG. 3, the high-speed loader 3 receives a plurality of items of input data. The allocation unit 11 allocates a plurality of records included in the plurality items of input data, to one of the plurality of pages.

The example of FIG. 3 illustrates a case where record 1 is allocated to page 1 and record 2 is allocated to page 2. Note that record n (n is a natural number) is allocated to page n.

Record 1 allocated to page 1 is acquired by data conversion process 1. Record 2 allocated to page 2 is acquired by data conversion process 2. Record n allocated to page n is acquired by data conversion process n. Each of data conversion processes may be allocated to one GPU core 31.

Each of data conversion processes performs conversion processing of converting an acquired record into the format of the database 4. For example, in a case where the input data is CSV format data, the record included in the data has a format of record in which character strings are separated by commas.

Each of data conversion processes converts a CSV record into a format that conforms to the format of the table in the database 4. The conversion allows the record included in the input data to be converted into a tuple. Each of data conversion processes performs record-to-tuple conversion in parallel.

As described above, one line pointer creation process is generated for every page. In the example of FIG. 3, a line pointer is represented as "LP". In the example of FIG. 3, n line pointer creation processes are generated corresponding to pages 1 to n. Note that one line pointer creation process is generated for one page.

Every time the tuple is acquired, the line pointer creation process writes the line pointer to the page, and generates a page creation process corresponding to the tuple. Therefore, the line pointer creation process generates a plurality of page creation processes. In the example of FIG. 3, a line pointer creation process 1 generates a plurality of page creation processes 1A, 1B, . . . .

In generation of the page creation process, the line pointer creation process passes line pointer information to the page creation process. Each of page creation processes writes a corresponding tuple to the page on the basis of an offset (write start position) out of the line pointer information passed from the line pointer creation process.

Each of page creation processes writes a tuple to the page, thereby generating one page on which a plurality of tuples has been written. Each of page creation processes writes tuples in parallel on the corresponding pages.

As described above, each of pages is stored in the shared memory 34. As illustrated in the example of FIG. 4, after completion of writing of tuples to each of pages, then the reflection unit 14 performs processing of inserting each of the pages into the table of the database 4. Data is reflected to the database 4 by the processing.

<Example of Tuple Writing With Page Locked>

Next, an example of tuple writing with a page locked will be described with reference to the examples of FIGS. 5 to 8. In example of FIGS. 5 to 7, execution of access from one process to the page stored in the shared memory 34 would lock the page and then regulate access from another process.

With regard to the page lock, the similar applies to a case where the page is stored in the L1 cache memory 33 as described above. This is because access from a plurality of processes to the L1 cache memory 33 would be regulated.

The line pointer creation process writes a line pointer LP1 to the page stored in the shared memory 34 in accordance with the acquisition of a tuple 1. The line pointer creation process locks the page when writing the line pointer LP1 to the page.

Locking the page will regulate access to the page from other processes. When the page is unlocked, access to the page from other processes will be permitted. That is, exclusive control is performed on the page.

Writing of the tuple 1 is suppressed while the line pointer creation process is writing the line pointer LP1 corresponding to the tuple 1 to the page. After completion of the writing of the line pointer LP1, then the page is unlocked.

Figure 6:
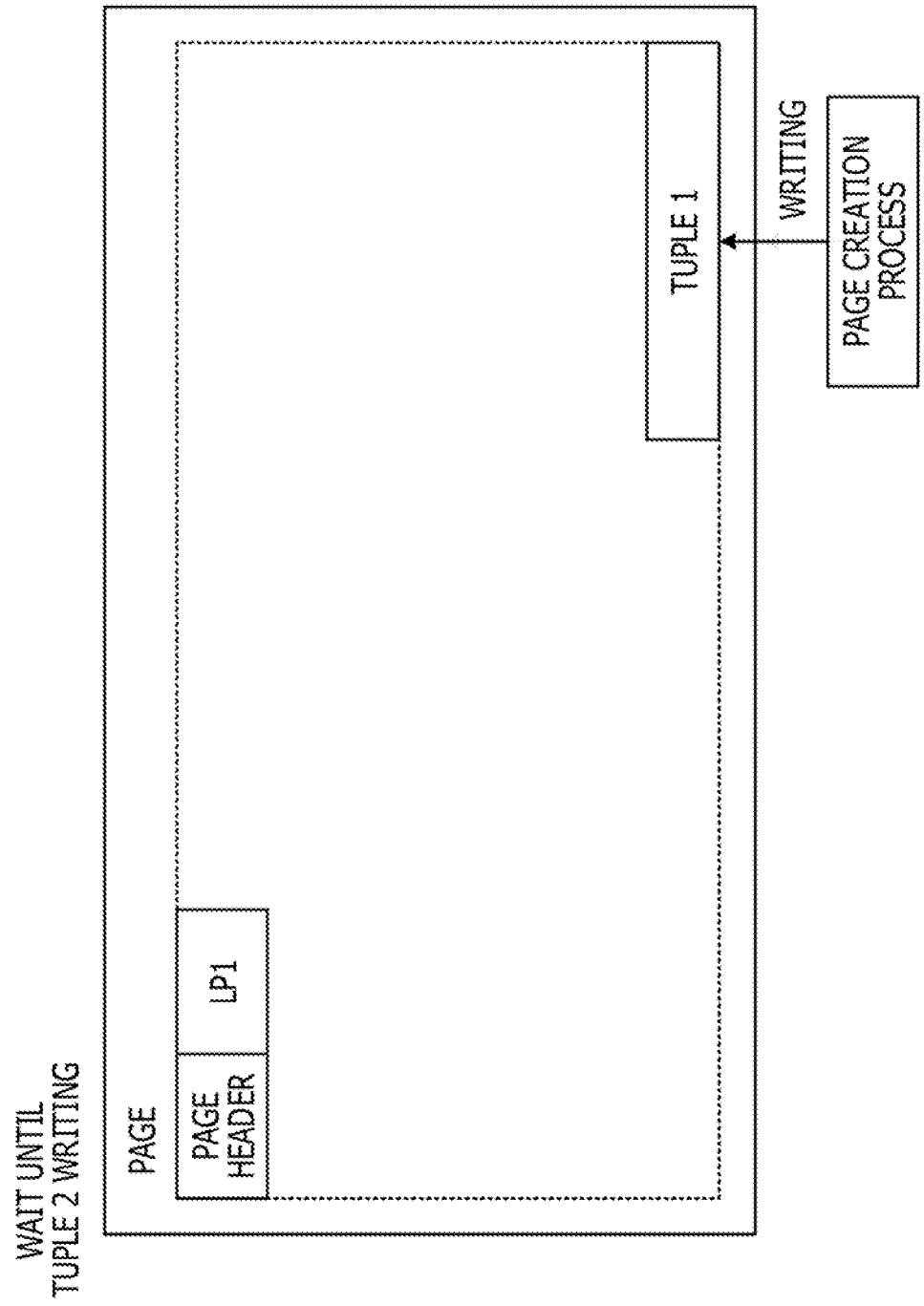
FIG. 6 is a view (part 2) illustrating an example of tuple writing in a case where a page is locked.

When the page is unlocked, as illustrated in the example of FIG. 6, the page creation process 1 corresponding to the tuple 1 locks the page and writes the tuple 1 to the page. When the page is locked, access to the page from other processes including the line pointer creation process will be regulated.

As illustrated in the example of FIG. 6, in a case where the line pointer creation process has acquired a tuple 2, the line pointer creation process waits until completion of the writing of the tuple 1. After completion of writing of the tuple 1 to the page, then the page is unlocked.

Figure 7:
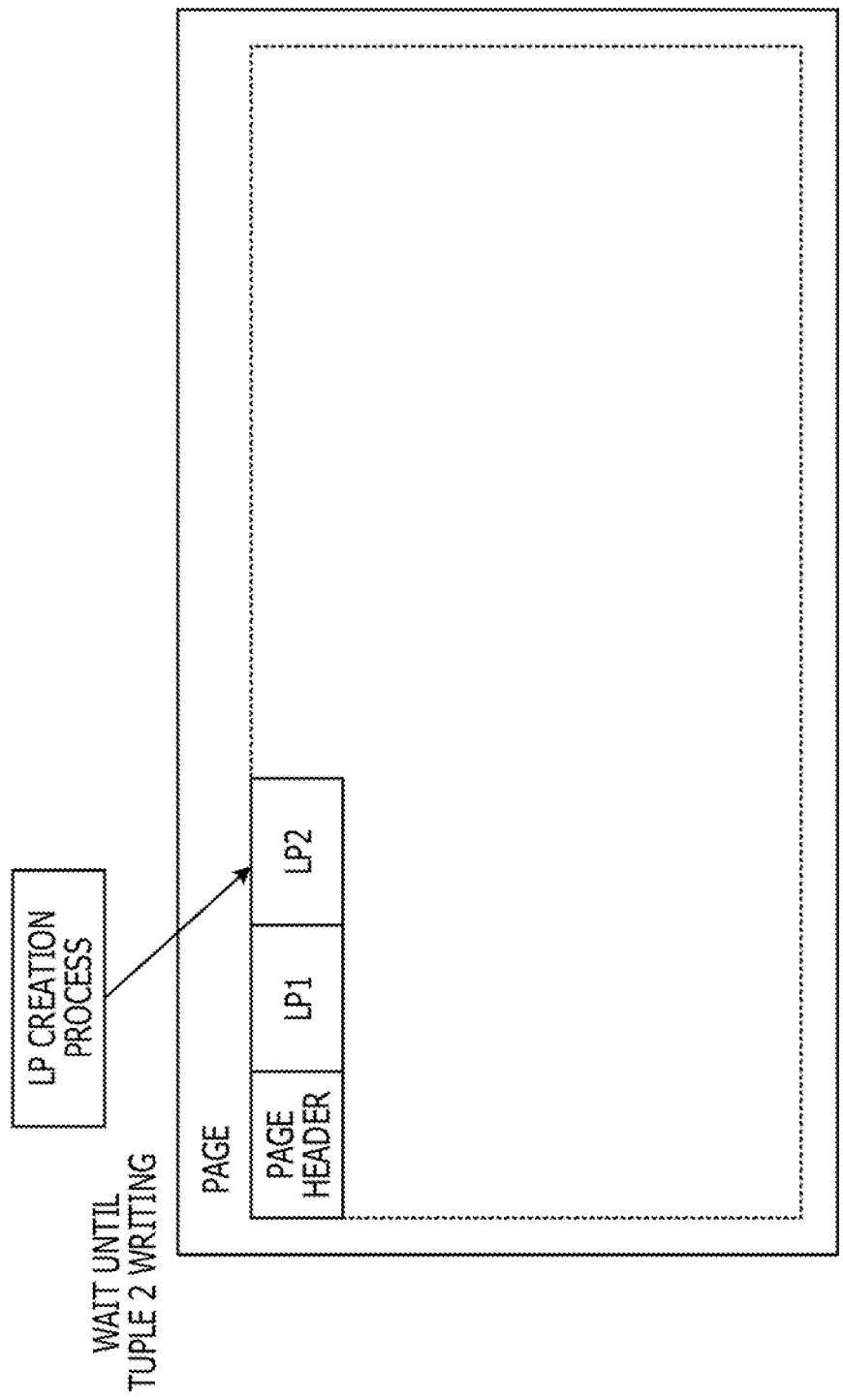
FIG. 7 is a view (part 3) illustrating an example of tuple writing in a case where a page is locked.

When the page is unlocked, as illustrated in the example of FIG. 7, the line pointer creation process locks the page and writes the line pointer of the tuple 2 to the page. When the line pointer creation process unlocks the page, the page creation process locks the page and writes the tuple 2 to the page, as illustrated in the example of FIG. 8.

Figure 8:
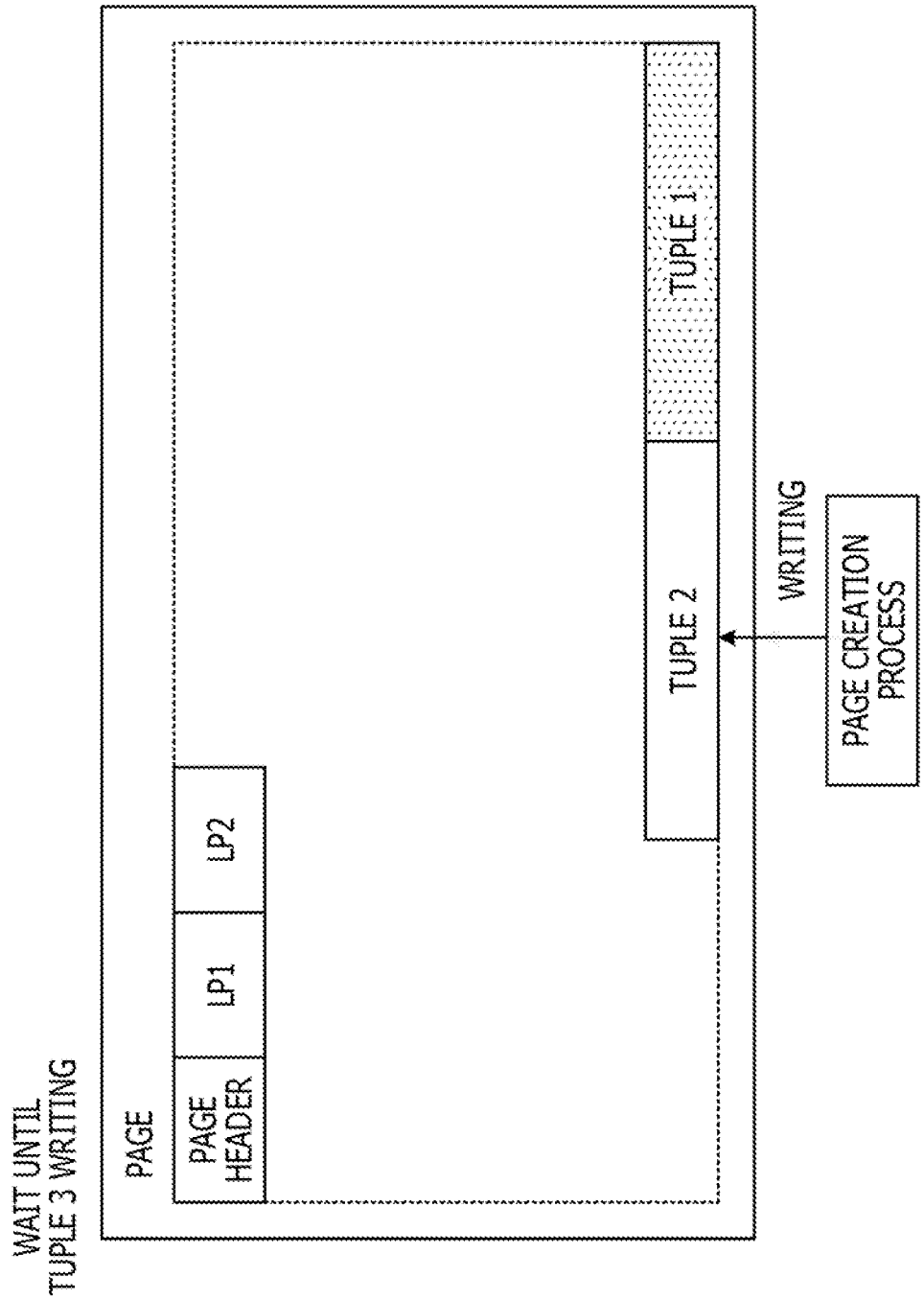
FIG. 8 is a view (part 4) illustrating an example of tuple writing in a case where a page is locked

As illustrated in the example of FIG. 8, the writing of the tuple 1 is completed when the tuple 2 is written. In the example of FIG. 8, the hatched tuple 1 indicates that writing has been completed.

Accordingly, tuple writing by one page creation process is permitted to one page, enabling the page creation process to write tuples sequentially in the page. Accordingly, this makes it possible to arrange the tuple 1 and the tuple 2 continuously, leading to avoidance of overwriting the tuple 2 over the tuple 1.

Meanwhile, as described above, each of processes writes a line pointer or a tuple to a page after locking the page, and thus, writing tuples in parallel by a plurality of page creation processes to one page will be regulated. Accordingly, parallelism of page generation would not be improved, making it difficult to achieve higher speed in load processing.

<Example of Problem in Writing a Plurality of Tuples in Parallel Without Locking Page>

Next, with reference to FIG. 9, an example of a problem in writing tuples to the page in parallel by a plurality of page creation processes without locking the page stored in the shared memory 34 will be described.

As described above, a plurality of GPU cores 31 is permitted to access the shared memory 34 simultaneously. Therefore, without execution of page locking, it is possible to write tuples to the page in parallel by a plurality of page creation processes to the shared memory 34.

Accordingly, a plurality of processes can write in parallel to the page stored in the shared memory 34. For example, FIG. 9 illustrates an example in which five page creation processes write tuples 1 to 5 in parallel to pages, individually.

Figure 9:
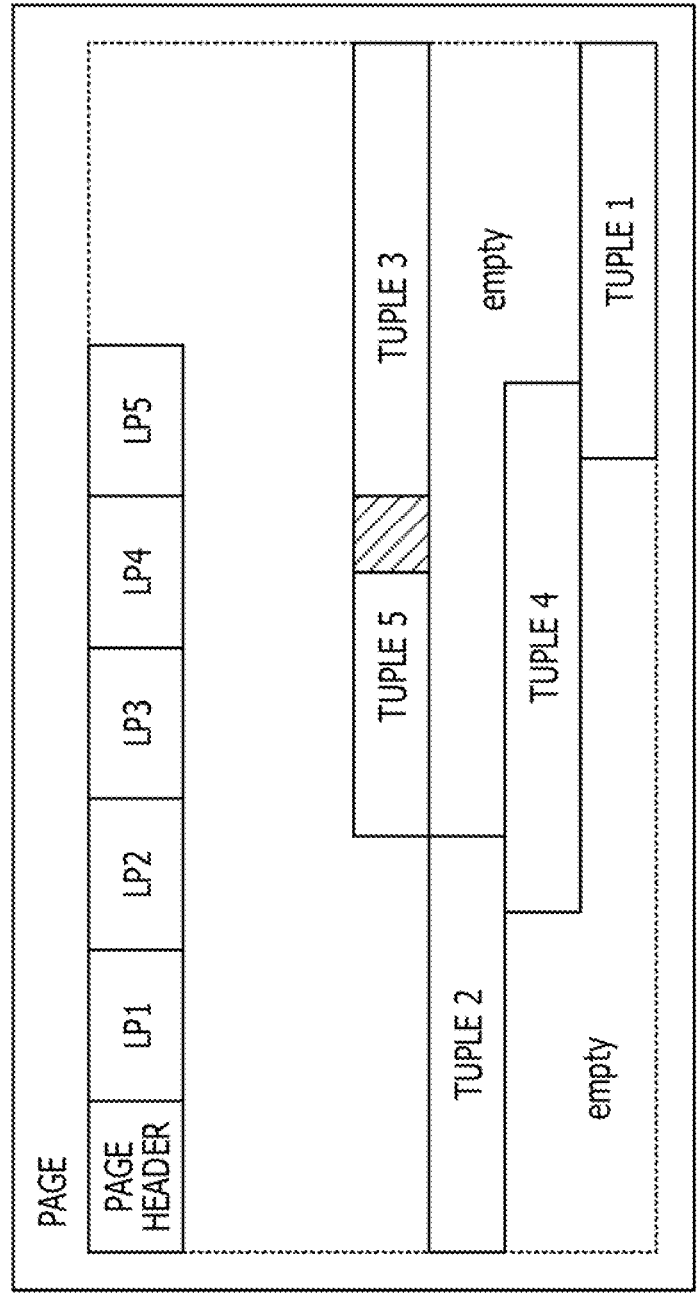
FIG. 9 is a view illustrating an example of a problem in performing parallel writing of a plurality of tuples without locking a page.

In the example of FIG. 9, since the page is not locked, five page creation processes can write tuples to the page in parallel. However, allowing each of page creation processes to freely write tuples would lead to a result in which the tuples in the page are not continuous, and this might cause overwriting of another tuple over the tuple in the page.

In the example of FIG. 9, there is a region where no tuple exists in the page. The region (discontinuous region) occurs due to discontinuous writing of the tuples. Occurrence of a discontinuous region in a page causes reduction of the page usage rate. In the example of FIG. 9, the discontinuous region is denoted as "empty".

Reduction in the page usage rate leads to the reduction in search performance in searching the database 4. In contrast, continuous writing of tuples on a page increases the page usage rate, leading to improvement of the above-described search performance.

In addition, when a tuple in a page is overwritten with another tuple, the tuple information would be lost. In the example of FIG. 9, since the tuple 3 is overwritten with the tuple 5, part of information of the tuple 3 (hatched region in the example of FIG. 9) would be lost.

<Example of Writing of Tuples to a Page of Shared Memory in the Embodiment>

Next, an example of writing of tuples to a page of the shared memory 34 in the embodiment will be described with reference to FIGS. 10 to 15. The pages in the examples of FIGS. 10 to 15 are stored in the shared memory 34. Therefore, simultaneous access to a page by a plurality of processes will be permitted. In addition, a plurality of processes writes to the page in parallel without locking the page in the shared memory 34.

Figure 10:
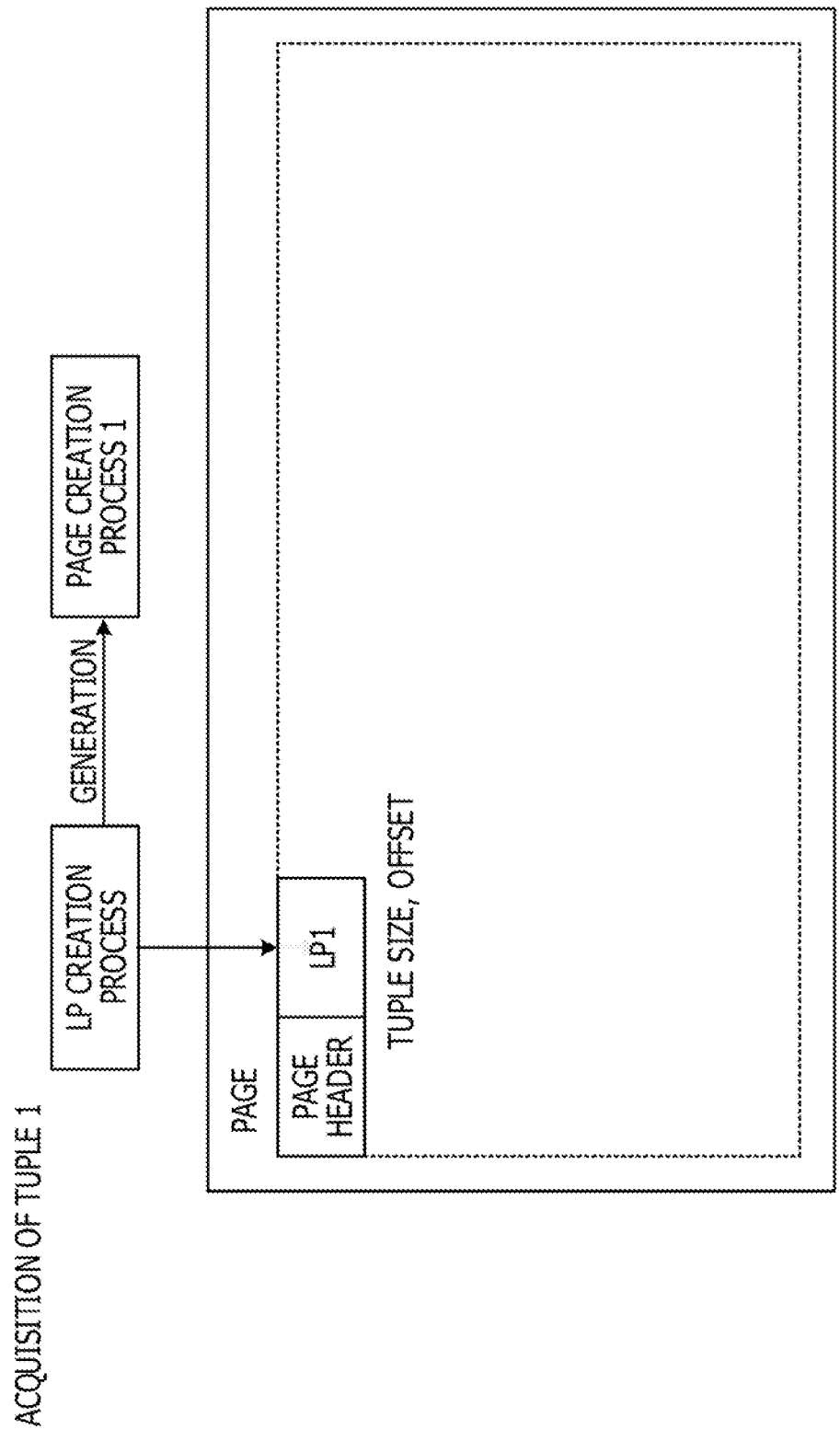
FIG. 10 is a view (part 1) illustrating an example of tuple writing onto a page in a shared memory.

As illustrated in the example of FIG. 10, one line pointer creation process is generated for one page. After acquisition of the tuple 1, the line pointer creation process writes the line pointer LP1 corresponding to the tuple 1 to the region following a page header in the page. The line pointer LP1 includes tuple size and offset information of the tuple 1.

The line pointer creation process may determine the offset on the basis of the offset and tuple size of the line pointer that has been already written. Since there is no written line pointer in the example of FIG. 10, the line pointer creation unit sets an initial position (initial address) to the write start position (offset) of the tuple 1.

The line pointer creation process writes the line pointer LP1 to page 1, and generates a page creation process 1 corresponding to the tuple 1. The page creation process 1 is a process of writing the tuple 1 to the page.

The generated page creation process 1 and the line pointer creation process operate asynchronously and independently. For example, it is assumed that the page creation process 1 and the line pointer creation process are allocated to mutually different GPU cores 31. The processes allocated to each of the GPU cores 31 operate asynchronously and independently.

Therefore, the operation of the page creation process 1 is separated from the operation of the line pointer creation process. The line pointer creation process passes the information of the line pointer LP1 to the page creation process 1 when generating the page creation process 1.

The page creation process 1 recognizes the write start position of the tuple 1 in the page on the basis of an offset out of the line pointer LP1 passed from the line pointer creation process.

Figure 11:
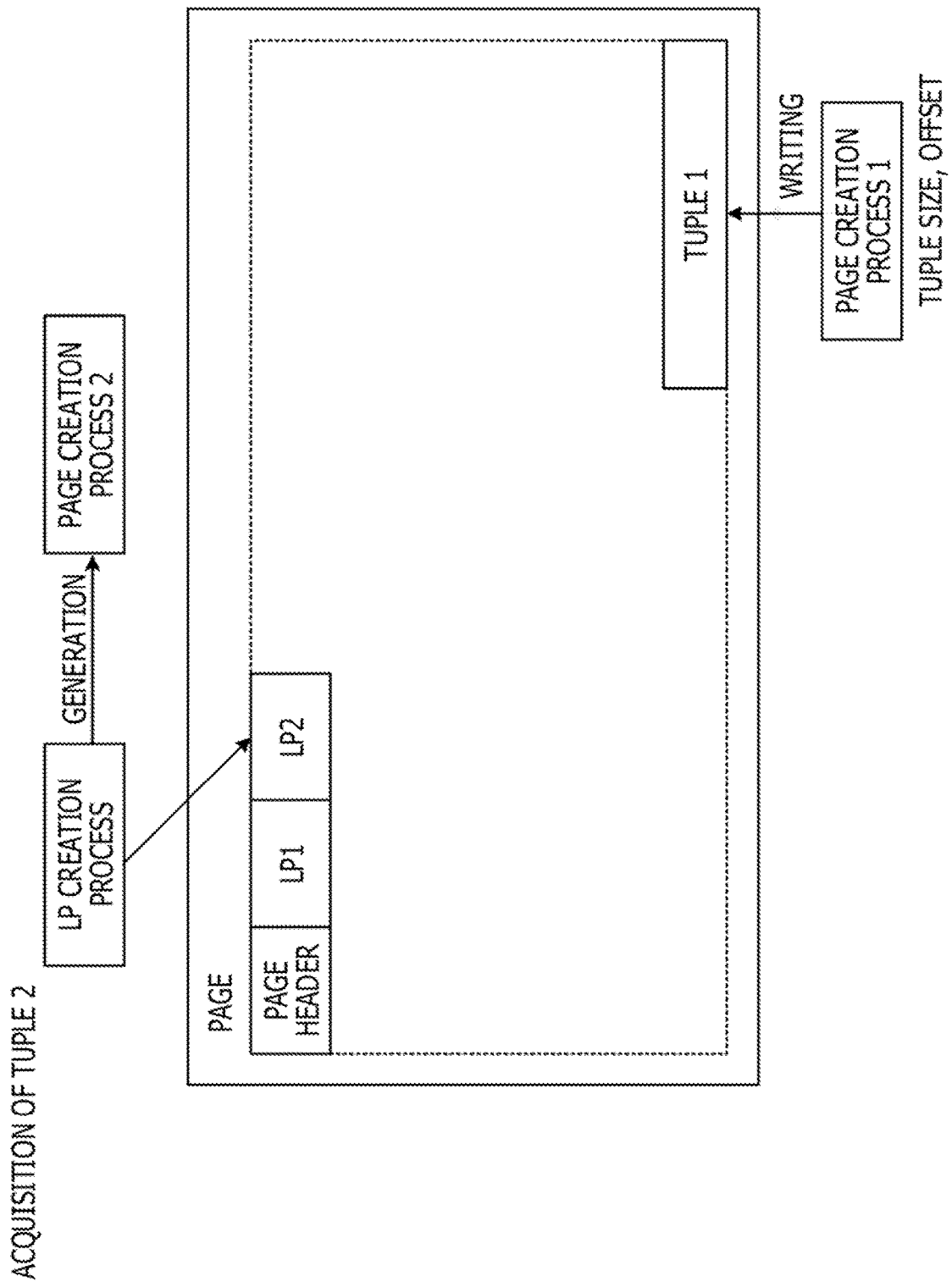
FIG. 11 is a view (part 2) illustrating an example of tuple writing onto a page in a shared memory.

As illustrated in the example of FIG. 11, the page creation process 1 writes the tuple 1 in the region designated by the recognized offset (write start position). The page creation process 1 writes the tuple 1 to the page regardless of the operation of the line pointer creation process. Accordingly, the line pointer creation process and the page creation process 1 write to the page in parallel.

In the example of FIG. 11, the line pointer creation process acquires a tuple 2. Since the information amount of the line pointer is smaller than the information amount of the tuple, the writing of the line pointer LP1 is completed before completion of the writing of the tuple 1 by the page creation process 1.

The line pointer creation process sets a later position from the above-described initial position by the tuple size of the tuple 1 (for example, a later address from the initial address by the tuple size) as a write start position (offset).

The line pointer creation process writes the line pointer LP2 including the tuple size of the tuple 2 and the above-described offset to the region that follows the line pointer LP1. The line pointer creation process writes the line pointer LP2 to the page, generates a page creation process 2, and passes the information of the line pointer LP2 to the line pointer creation process.

The page creation process 2 writes the tuple 2 on the basis of the offset of the line pointer LP2 (region designated by the line pointer LP2). Accordingly, it is possible to continuously write the tuple 1 and the tuple 2. In addition, the tuple 2 will not be overwritten over the tuple 1.

Figure 12:
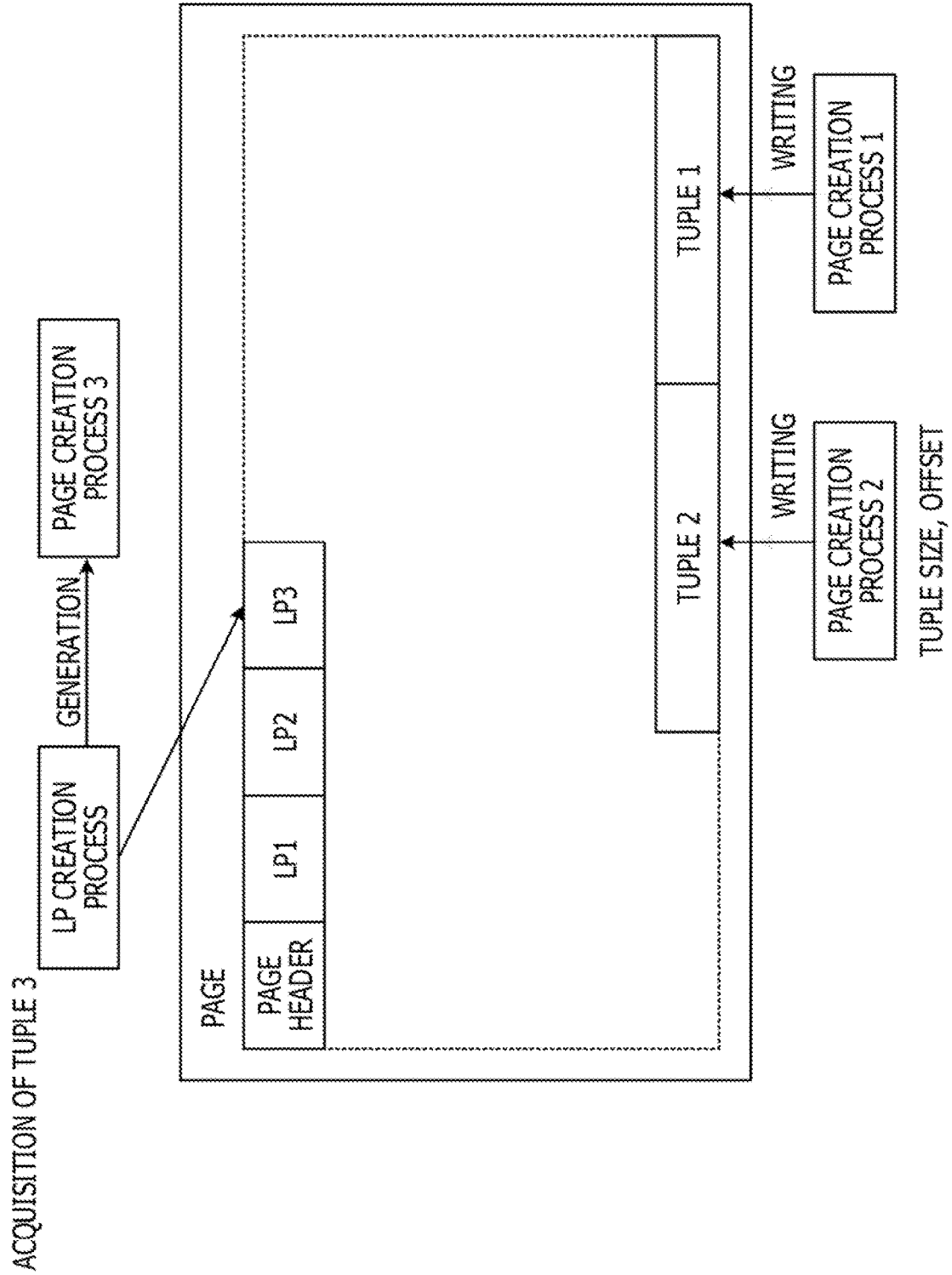
FIG. 12 is a view (part 3) illustrating an example of tuple writing onto a page in a shared memory.

In the example of FIG. 12, when the line pointer creation process acquires the tuple 3, the writing of the tuple 1 by the page creation process 1 and the writing of the tuple 2 by the page creation process 2 are performed in parallel.

Figure 13:
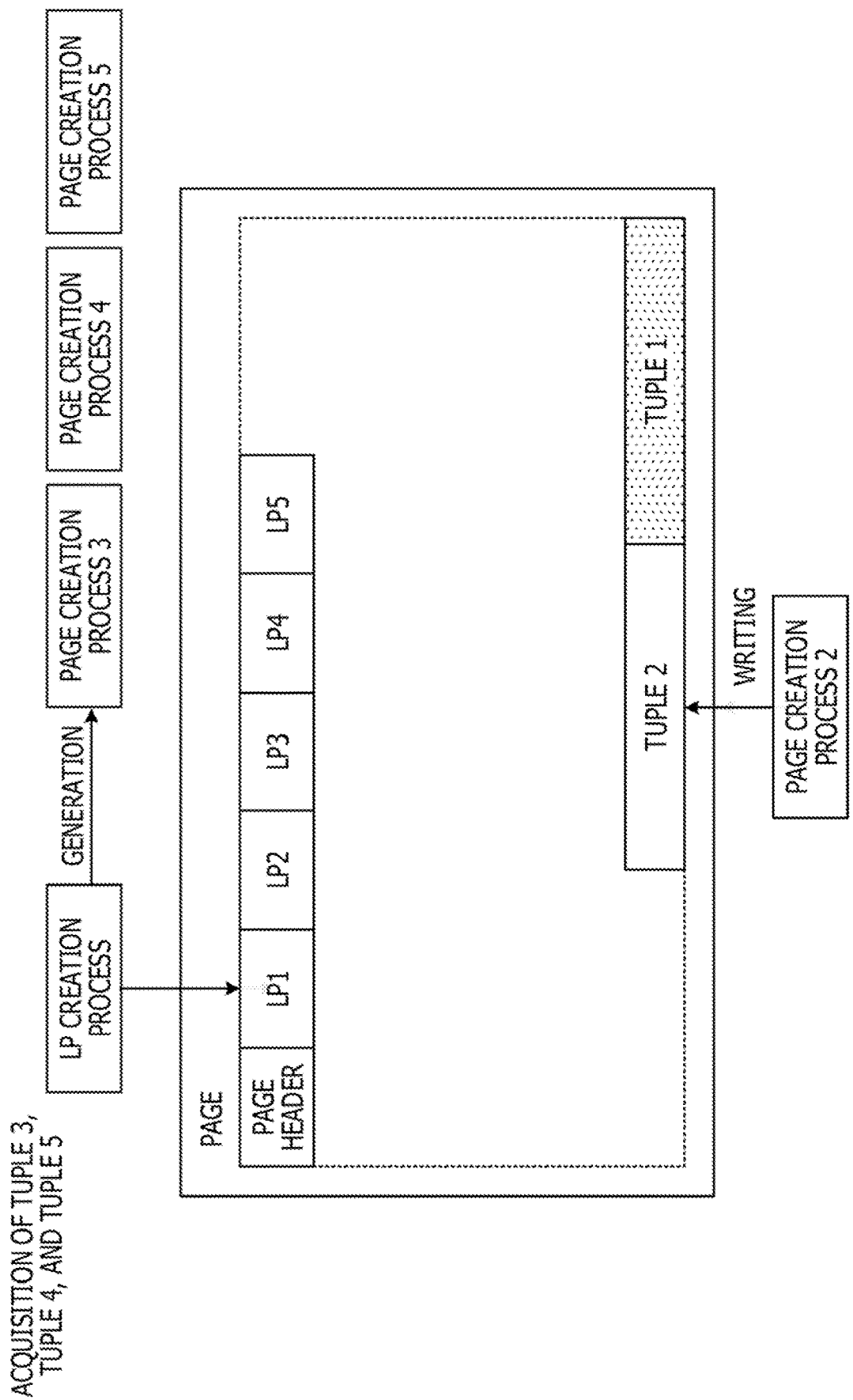
FIG. 13 is a view (part 4) illustrating an example of tuple writing onto a page in a shared memory.

Next, in the example of FIG. 13, it is assumed that the line pointer creation process acquires the three tuples in the order of tuple 3, tuple 4, and tuple 5 at short time intervals. The line pointer creation process writes the corresponding line pointers to the page in the order of tuple 3, tuple 4, and tuple 5.

The line pointer creation process sets the offset of the line pointer LP3 corresponding to the tuple 3 to a position after the tuple size of the tuple 2 from the offset of the line pointer LP2. That is, the line pointer creation process sets the position after the tuple size of the previous tuple from the offset of the line pointer corresponding to the above-described previous tuple of the acquired tuple, as the offset of the acquired tuple.

The information amount of the line pointer in the embodiment is small. Therefore, the line pointer creation process can sequentially write the line pointers to the page even with short time intervals in acquisition of the above-described three tuples.

As described above, parallel writing to a page by each of processes is permitted without locking the page. Therefore, the page creation process can write tuples to the page while the line pointer creation process is writing the line pointer to the page.

The information amount of the line pointer is smaller than the information amount of the tuple, and in addition, the line pointer creation process and the page creation process are permitted to write to the page in parallel.

Therefore, the page creation process will not wait until the operation of the tuple creation process is completed. Accordingly, the degree of parallelism is improved, leading to achievement of higher speed in load processing.

The line pointer creation process writes a tuple to a page, and generates a page creation process for the corresponding tuple. In the example of FIG. 13, the line pointer creation process sequentially generates a page creation process 3, a page creation process 4, and a page creation process 5.

In the example of FIG. 13, writing of tuple 1 is completed. Meanwhile, the page creation process 2 is writing the tuple 2.

Figure 14:
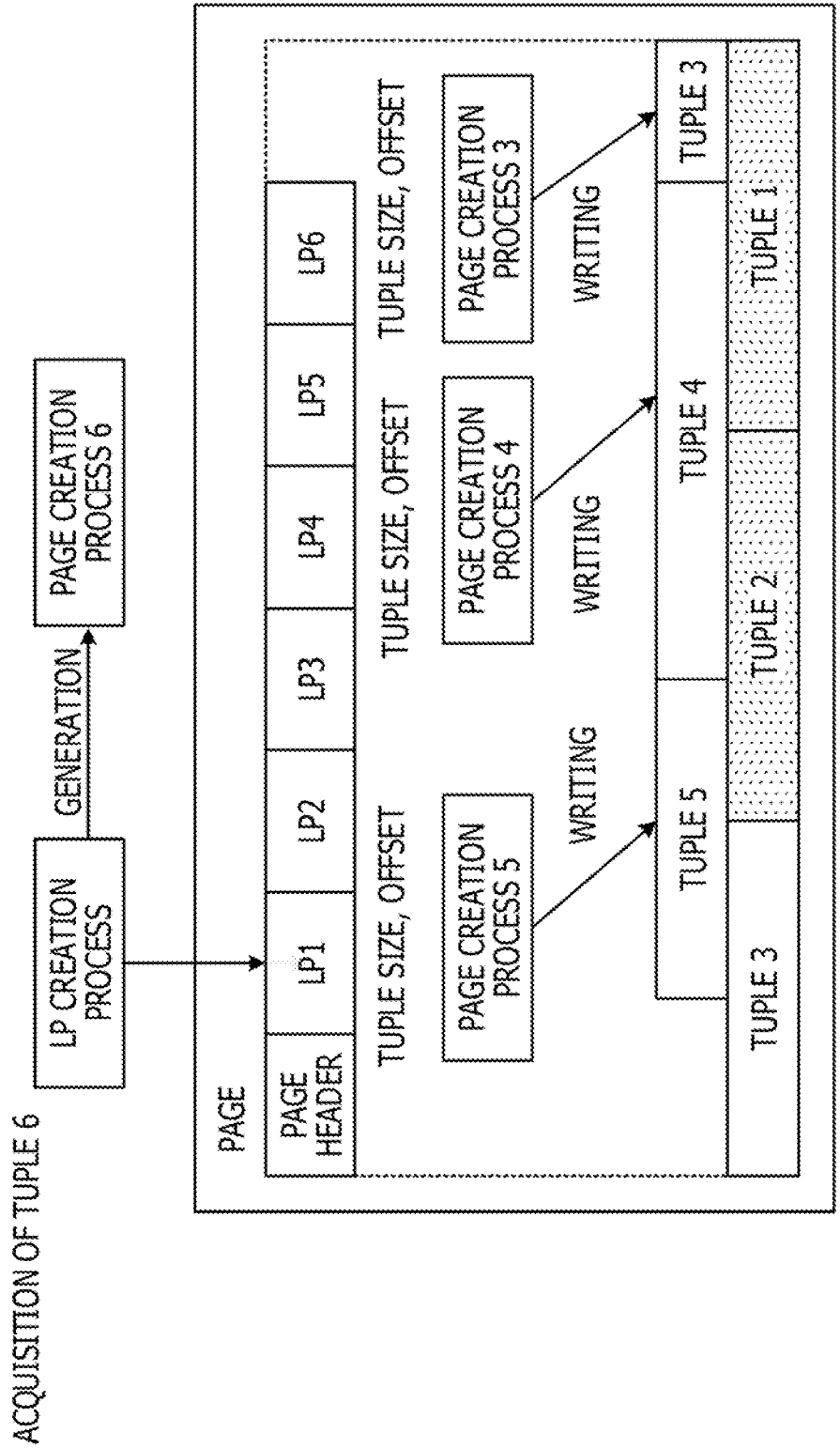
FIG. 14 is a view (part 5) illustrating an example of tuple writing onto a page in a shared memory.
Figure 15:
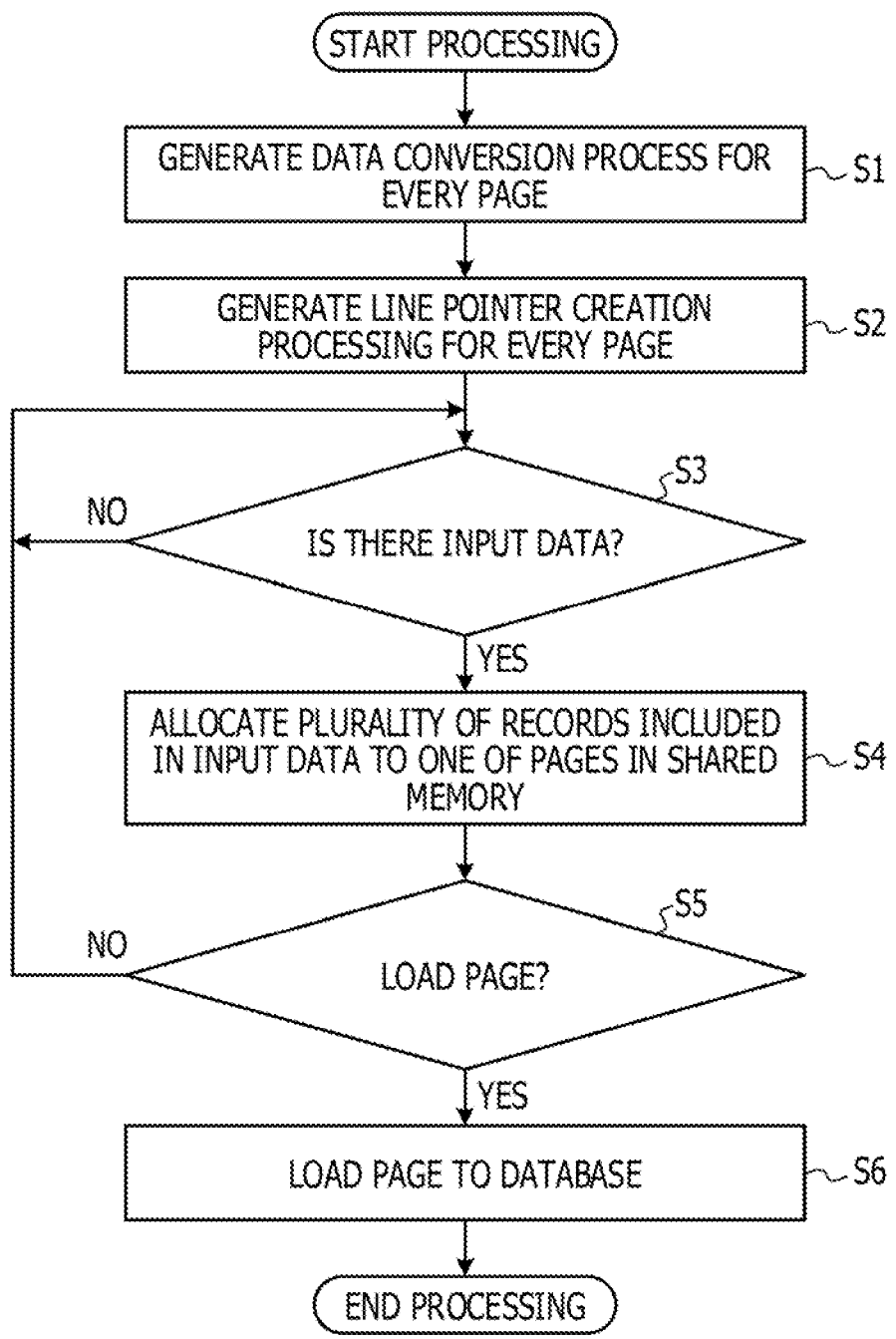
FIG. 15 is a flowchart (part 1) illustrating an example of a processing flow according to the embodiment.

In the example of FIG. 14, the writing of the tuple 3 by the page creation process 3, the writing of the tuple 4 by the page creation process 4, and the writing of the tuple 5 by the page creation process 5 are performed in parallel.

Therefore, writing of a plurality of tuples is performed in parallel, leading to improvement of parallelism and achievement of higher speed in load processing. In addition, the line pointer creation process and each of page creation processes operate asynchronously and independently, leading to improvement of parallelism.

One line pointer creation process corresponding to one page generates a page creation process in accordance with the acquisition of a tuple, leading to generation of a plurality of page creation processes at short time intervals.

The line pointer creation process passes line pointer information (control information related to writing regions) to each of page creation processes, and then each of the page creation processes writes tuples in parallel on the basis of the line pointer information.

In a case where each of page creation processes writes a tuple in parallel, each of the page creation processes writes the tuple from the position designated by the offset in the page. Therefore, the above-described discontinuous region will not occur in the page even when the page is not locked. This makes it possible to avoid overwriting a tuple already written to the page with another tuple.

The line pointer creation process writes the line pointer to the page in accordance with acquisition of tuples. As described above, the line pointer includes tuple size and offset information. When the database 4 is searched, the write positions of the plurality of tuples stored in the page are specified on the basis of the line pointer.

For example, it is assumed that the information amount of the line pointer is a fixed amount of 4 bytes. The line pointer creation process sequentially writes the line pointer to the page in accordance with acquisition of tuples. Since the line pointer has a fixed amount of 4 bytes, the line pointer creation process sequentially writes the line pointer to the page in units of 4 bytes in accordance with acquisition of tuples.

Accordingly, the line pointer creation process can sequentially write the line pointer to the page without locking or unlocking the page header. For example, execution of control of the lock/unlock of the page header by the line pointer creation process would produce a waiting time due to the control. The waiting time would be a factor that reduces the parallelism.

Even when the information amount of the line pointer is as small as 4 bytes, improvement of parallelism together with an increase in the number of GPU cores 31 would promote the effect of the above-described waiting time on the processing time of the entire load processing In the embodiment, the line pointer creation process sequentially writes the line pointer to the page every predetermined information amount (4 bytes) without locking or unlocking the page header. This eliminates the above-described waiting time, making it possible to achieve higher speed in load processing.

<Flowchart Illustrating an Example of Processing Flow of the Embodiment>

An example of a processing flow of the embodiment will be described with reference to the flowcharts of FIGS. 15 to 18. As described above, the high-speed loader 3 generates one or more pages. The high-speed loader 3 generates a data conversion process for every page (step S1).

This will, generates a plurality of data conversion processes. The plurality of data conversion processes may each be allocated to various GPU cores 31. The high-speed loader 3 generates one line pointer creation process for every page (step S2). The line pointer creation process for every page may each be allocated to various GPU cores 31.

The high-speed loader 3 determines whether input data (CSV data) has been received (step S3). For example, in a case where the communication unit 15 has received input data from the server 2, a result of step S3 will be YES.

In the case of NO in step S3, the processing will not proceed to the next step. In the case of YES in step S3, the allocation unit 11 allocates a plurality of records included in the input data to one of the plurality of pages in the shared memory 34 (step S4).

The high-speed loader 3 determines whether to load the page into the database 4 (step S5). In the case of NO in step S5, the processing returns to step S3. In the case of YES in step S5, the reflection unit 14 loads a plurality of pages in which a plurality of tuples has been written, to the database 4, and thereby reflects each of the tuples to the database 4 (step S6.

For example, the communication unit 15 may transmit a plurality of pages to the database 4, and the database 4 may insert the received plurality of pages into a table, and may thereby perform the processing of step S6.

Figure 16:
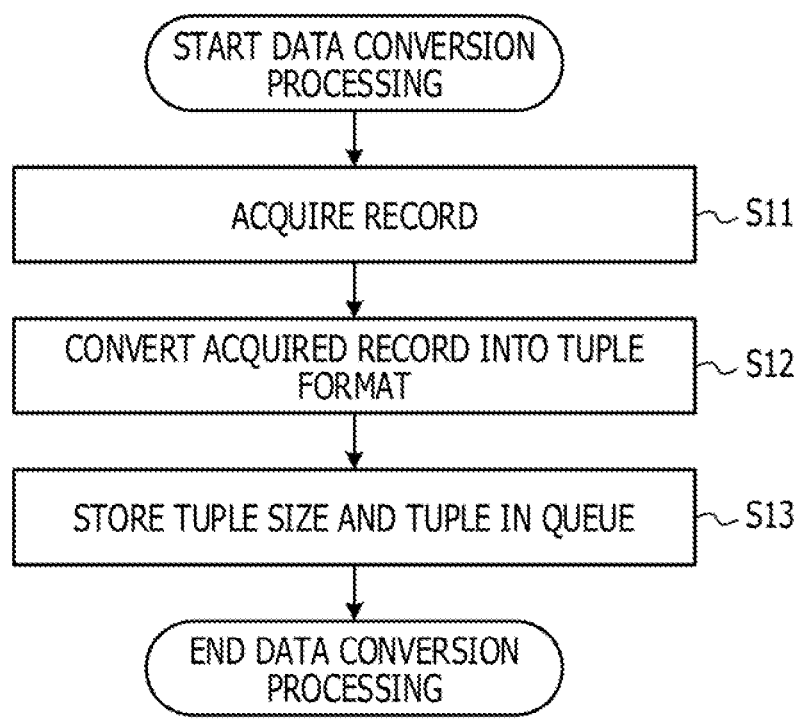
FIG. 16 is a flowchart (part 2) illustrating an example of a processing flow according to the embodiment.

An example of a data conversion processing flow performed by each of data conversion processes will be described with reference to FIG. 16. A plurality of data conversion processes sequentially acquires a plurality of records included in input data (step S11).

Each of the data conversion processes converts the acquired record into a tuple that conforms to the format of the database 4 (step S12). The tuple is data in a format that can be inserted into the table of the database 4.

The data conversion process stores the above-described tuple and tuple size information regarding the tuple, in a queue (step S13). For example, the queue may be implemented by a partial region of the shared memory 34.

Figure 17:
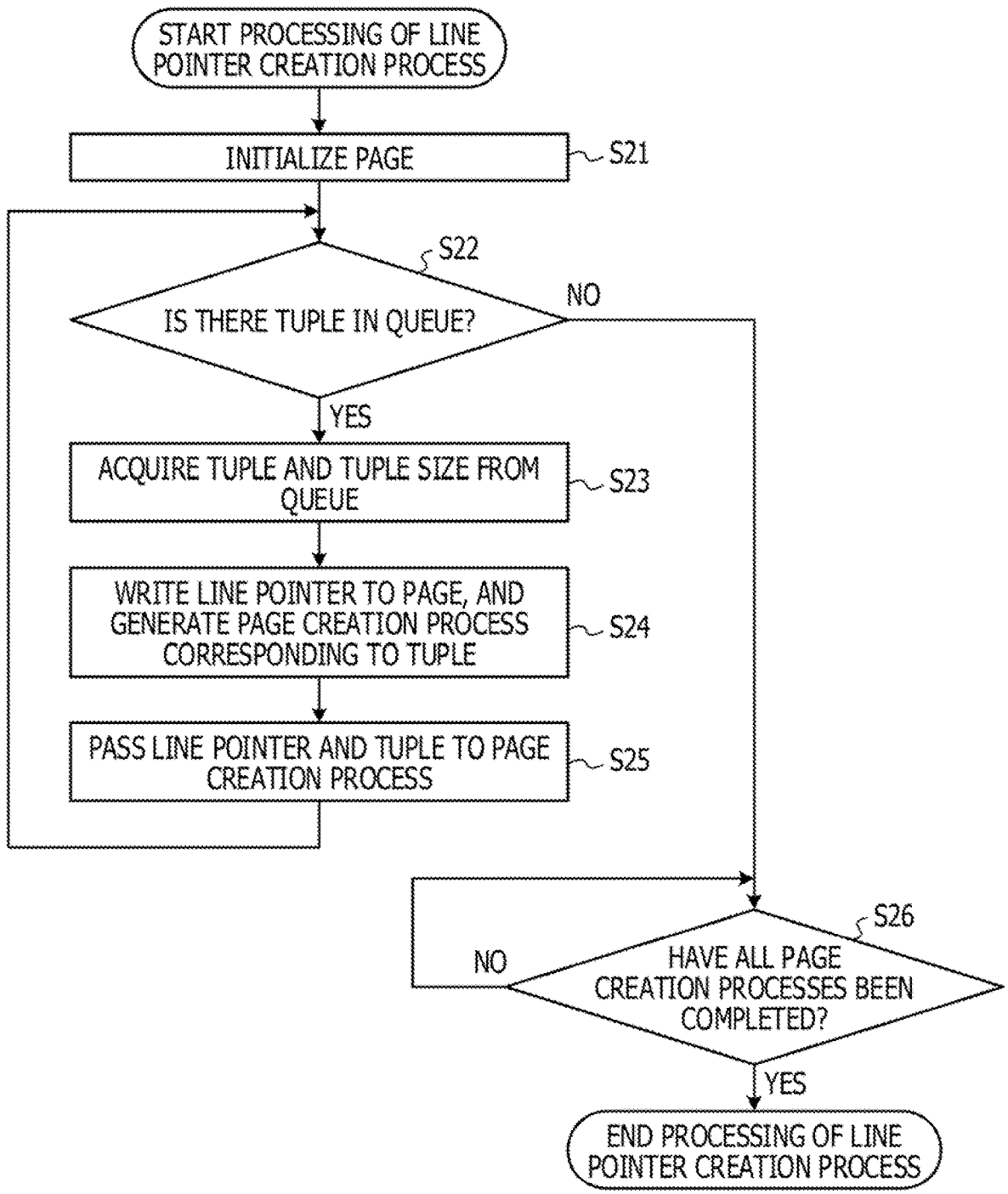
FIG. 17 is a flowchart (part 3) illustrating an example of a processing flow according to the embodiment.

Next, a processing flow of the line pointer creation process will be described with reference to FIG. 17. As described above, one line pointer creation process is generated for one page. The line pointer creation process initializes the corresponding page (step S21).

The line pointer creation process determines whether there is a tuple in the above-described queue (step S22). In the case of YES in step S22, the line pointer creation process acquires a tuple from the queue (step S23).

Tuples are stored in the queue in the order in which the data conversion process converts records. The line pointer creation process acquires a tuple from the queue, and thereby acquires a tuple and tuple size information regarding the tuple according to the order of conversion from the record to the tuple.

The line pointer creation process writes a line pointer including the tuple size and offset to the page, and generates a page creation process corresponding to the tuple (step S24). In addition, the line pointer creation process passes the line pointer and the tuple to the generated page creation process (step S25).

Every time the line pointer creation process acquires the tuple and tuple size information from the queue, the line pointer creation process writes the line pointer to the page and generates a corresponding page creation process. Each of the generated page creation processes operates asynchronously and independently. In addition, each of the page creation process and line pointer creation process operates asynchronously and independently.

In the case of NO in step S22, it is determined whether all the operations of the page creation process corresponding to the line pointer creation process have been completed (step S26). In the case of NO in step S26, the processing returns to step S26 because the page creation process is writing a tuple to the page. In the case of YES in step S26, the processing is finished.

Figure 18:
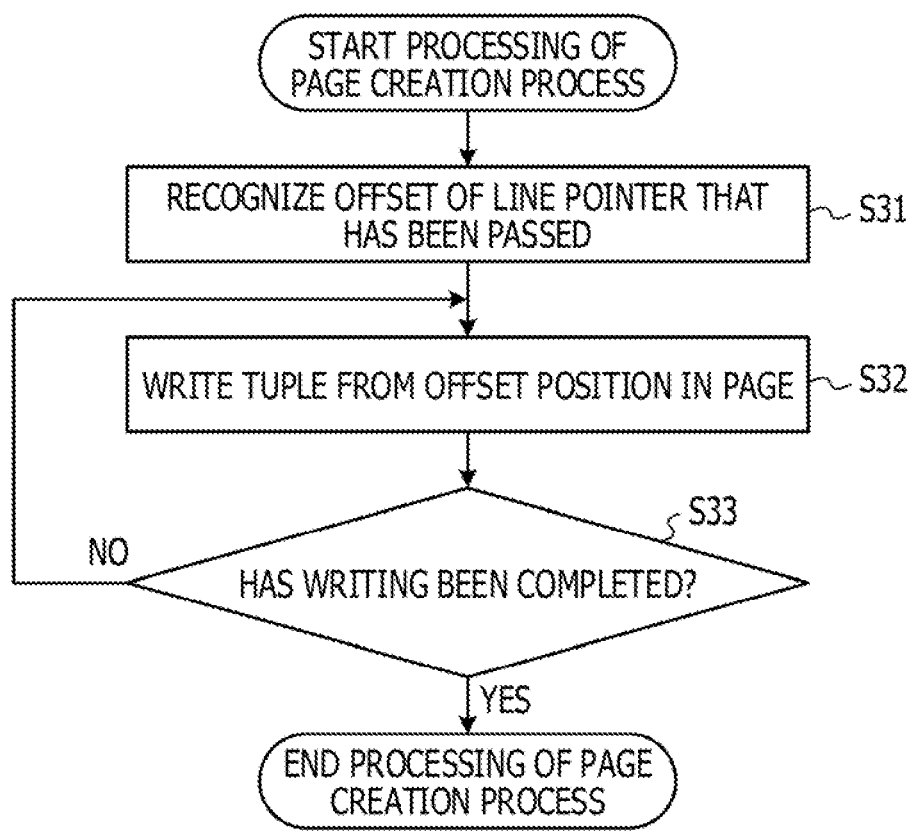
FIG. 18 is a flowchart (part 4) illustrating an example of a processing flow according to the embodiment.

Next, processing of the page creation process will be described with reference to FIG. 18. As described above, the line pointer creation process passes the line pointer to the generated page creation process. The page creation process recognizes an offset out of the line pointer (step S31). The offset indicates the tuple write start position in the page.

The page creation process writes the tuple from the offset position in the page (step S32). The page creation process writes the tuple to the page until the tuple writing is completed (NO in step S33). When tuple writing is completed (YES in step S33), the processing of the page creation process is finished.

As described above, a plurality of page creation processes corresponding to one page operates asynchronously and in parallel. Accordingly, each of page creation processes performs each of processing illustrated in FIG. 18 in parallel, and thereby tuples are written in parallel.

<Example of Hardware Configuration of High-Speed Loader>

Figure 19:
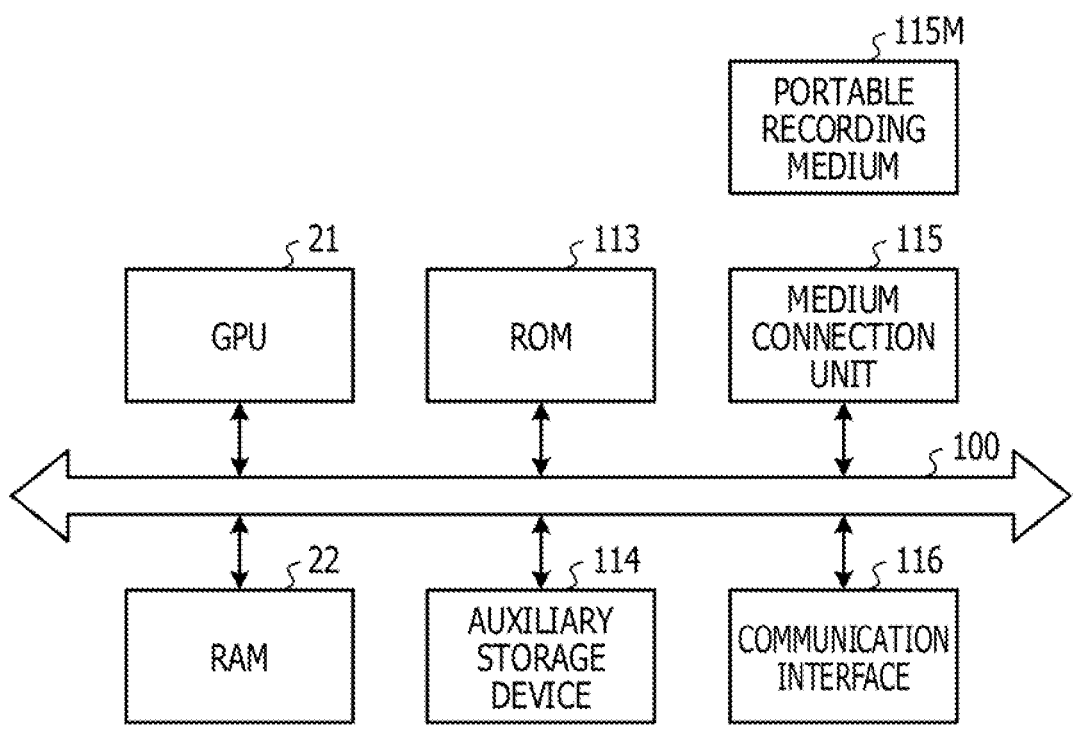
FIG. 19 is a diagram illustrating an example of a hardware configuration of a high-speed loader.

Next, an example of a hardware configuration of the high-speed loader 3 will be described with reference to an example in FIG. 19. As illustrated in the example of FIG. 19, a GPU 21, a RAM 22, and a read only memory (ROM) 113 are connected to a bus 100. In addition, an auxiliary storage device 114, a medium connection unit 115, and a communication interface 116 are connected to the bus 100.

The GPU 21 executes a program decompressed in the RAM 22. As the program to be executed, a program that executes the processing in the embodiment may be applied.

The ROM 113 is a nonvolatile storage device which stores the program developed in the RAM 112. The auxiliary storage device 114 is a storage device which stores various types of information, and for example, a hard disk drive, a semiconductor memory, or the like, may be applied as this device. The medium connection unit 115 is provided to be connectable to a portable recording medium 120.

As the portable recording medium 115M, portable memory (semiconductor memory, for example), an optical disc (for example, compact disc (CD) and digital versatile disc (DVD)), or the like, may be applied. The information processing program that executes the processing in the embodiments may be recorded in the portable recording medium 115M.

The allocation unit 11, the data conversion unit 12, the writing unit 13, and the reflection unit 14 described above may be implemented by execution of the given program by the GPU 21. In addition, the communication unit 15 may be implemented by the communication interface 116.

All of the RAM 22, the ROM 113, the auxiliary storage device 114, and the portable recording medium 115M are examples of a computer-readable tangible storage medium. These tangible storage media are not transitory media such as a signal carrier.

<Others>

The above-described embodiment is an example in which the GPU 21 is mounted on the high-speed loader 3. However, a central processing unit (CPU) may be mounted on the high-speed loader 3. Providing the CPU with a plurality of CPU cores would be able to implement the processing of the above-described embodiment. The GPU 21 and the CPU are examples of processors.

The high-speed loader 3 in the above-described embodiment is assumed to perform processing (load processing) of inserting a page in which a plurality of tuples has been written, into the database 4 in a single transaction.

For example, in online transaction processing (OLTP) operation, a plurality of transactions requests the database 4 for processing other than insertion processing, such as update processing, deletion processing, reference processing, or the like. For example, in the case of update processing, access to a page by other processes is regulated while the page is being updated.

Accordingly, in the OLTP service, in a case where a transaction related to update processing and a transaction related to reference processing occur simultaneously, for example, one transaction waits until completion of the processing of the other transaction. This would hinder achievement of higher processing speed.

Since the load processing described above is processing of inserting a page in which a plurality of tuples has been written into the database 4 in a single transaction, making it possible to achieve higher processing speed. The more the number of tuples included in a single transaction, the higher the processing speed. Therefore, the processing of the embodiment is suitable for load processing.

In addition, the system 1 of the above-described embodiment may be a system of a financial institution such as a bank. For example, in the bank system 1, the server 2 is assumed to be a mission critical server of the bank. The server 2 is connected to a large number of automated teller machines (ATMs).

A user of an ATM uses the ATM to perform financial transaction operation (for example, operation such as a transfer). When the mission critical server of the bank receives data related to one financial transaction from the ATM, the bank's core server processes the financial transaction as one record.

Since a large number of ATMs are connected to the bank's mission critical server, the bank's mission critical server (server 2) generates a large number of records in a short time. The server 2 generates input data from the large number of records, and transmits the input data to the high-speed loader 3.

After receiving the input data from the server 2, the high-speed loader 3 allocates a large number of records included in the input data to a plurality of pages. The high-speed loader 3 performs the processing of the embodiment, writes a plurality of tuples to each of pages, and generates a plurality of pages.

The high-speed loader 3 performs load processing of collectively inserting the plurality of pages into the database 4. Therefore, applying the high-speed loader 3 of the embodiment to a system that loads a large amount of records into a database, such as a bank system, makes it possible to reflect data related to financial transactions to the database at high speed. Note that the system 1 of the embodiment is not limited to a financial institution system.

The present embodiment is not limited to the embodiment described above, and various configurations and embodiments can be made without departing from the scope of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program comprising instructions which, when the program is executed by a computer, cause the computer to execute processing of loading a plurality of records to a database, the processing comprising:
   allocating the plurality of records to a page in shared memory, the shared memory being a memory configured to be accessed simultaneously from a plurality of processes executed in processor circuitry of the computer;
   generating, for each of the plurality of records, control information indicating a writing region in the page, the writing region being a region allocated to store that record adjacently to any of the plurality of records in the page;
   generating, for each of the plurality of records, a writing process to write that record to the writing area indicated in the generated control information;
   generating the page including the plurality of records by parallelly executing the writing process generated for each of the plurality of records; and
   loading the generated page including the plurality of records from the shared memory to the database.

2. The non-transitory computer-readable recording medium according to claim 1, the processing further including:
   obtaining a plurality of converted records by converting each of the plurality of records into a format that conforms to the database, and
   wherein
   the generating of the writing process includes generating, for each of the plurality of converted records, the writing process to write that converted record to the writing area indicated in the generated control information,
   the generating of the page includes generating the page including the plurality of converted records by parallelly executing the writing process generated for each of the plurality of converted records, and
   the loading of the generated page includes loading the generated page including the plurality of converted records from the shared memory.

3. The non-transitory computer-readable recording medium according to claim 1, wherein the processing further comprising:
   converting the plurality of records into a format that conforms to the database; and
   writing the plurality of converted records to the page by the plurality of writing processings.

4. The non-transitory computer-readable recording medium according to claim 3, wherein the processing further comprising:
   generating one control processing of writing the control information, in accordance with the page; and
   generating, by the one control processing, the plurality of writing processings in accordance with acquisition of the converted record.

5. The non-transitory computer-readable recording medium according to claim 4, wherein the processing further comprising:
   writing, by a control processing, the control information to the page in accordance with the acquisition of the record.

6. The non-transitory computer-readable recording medium according to claim 4, wherein the processing further comprising:
   passing the control information corresponding to the writing processing to the writing processing when the writing processing is generated by the control processing.

7. The non-transitory computer-readable recording medium according to claim 1, wherein
   a plurality of the writing processings operate asynchronously and in parallel with each other.

8. The non-transitory computer-readable recording medium according to claim 4, wherein
   a plurality of the writing processings and the control processing operate asynchronously and in parallel.

9. The non-transitory computer-readable recording medium according to claim 4, wherein
   an information amount of the control information that the control processing writes to the page is smaller than an information amount of the record that the writing processing writes to the page.

10. The non-transitory computer-readable recording medium according to claim 4, wherein
    the control information includes information regarding a write start position based on an information amount of a tuple already written to the page.

11. The non-transitory computer-readable recording medium according to claim 1, wherein
    the plurality of records are allocated to one of the plurality of pages in the shared memory, and the plurality of pages, on which the plurality of records are written, are reflected to the database.

12. The non-transitory computer-readable recording medium according to claim 1, wherein
the shared memory is memory that is mounted on a multi-core processor and is simultaneously accessible from a plurality of cores.

13. The non-transitory computer-readable recording medium according to claim 12, wherein
the shared memory is memory accessible at the same speed as an L1 cache memory.

14. The non-transitory computer-readable recording medium according to claim 13, wherein
a capacity of the shared memory is set larger than a capacity of the L1 cache memory.

15. A computer-implemented method of loading a plurality of records to a database, the method comprising:
allocating the plurality of records to a page in shared memory, the shared memory being a memory configured to be accessed simultaneously from a plurality of processes executed in processor circuitry of the computer;
generating, for each of the plurality of records, control information indicating a writing region in the page, the writing region being a region allocated to store that record adjacently to any of the plurality of records in the page;
generating, for each of the plurality of records, a writing process to write that record to the writing area indicated in the generated control information;
generating the page including the plurality of records by parallelly executing the writing process generated for each of the plurality of records; and
loading the generated page including the plurality of records from the shared memory to the database.

16. A data loading apparatus of loading a plurality of records to a database, the data loading apparatus comprising:
a memory; and
a processor coupled to the memory and configured to:
allocate the plurality of records to a page in shared memory, the shared memory being a memory configured to be accessed simultaneously from a plurality of processes executed in processor circuitry of the computer;
generating, for each of the plurality of records, control information indicating a writing region in the page, the writing region being a region allocated to store that record adjacently to any of the plurality of records in the page; and
generating, for each of the plurality of records, a writing process to write that record to the writing area indicated in the generated control information;
generate the page including the plurality of records by parallelly executing the writing process generated for each of the plurality of records; and
load the generated page including the plurality of records from the shared memory to the database.

* * * * *